United States Patent Office 2,983,601
Patented May 9, 1961

2,983,601

FERROUS ALLOYS AND ARTICLES MADE THEREFROM

Stewart G. Fletcher and Raymond P. Kells, Latrobe, Pa., assignors to Latrobe Steel Company, Latrobe, Pa., a corporation of Pennsylvania No Drawing. Filed Sept. 14, 1954, Ser. No. 455,810

17 Claims. (Cl. 75—126)

This invention relates to ferrous alloys and articles made therefrom and particularly to a ferrous alloy adapted to be used in the manufacture of high speed steel tools and characterized by longer tool life and ease of manufacture, and is a continuation-in-part of our application Serial No. 381,520 filed September 21, 1953, now abandoned. There has long been a demand for alloy steels which would, when made into tools, have a longer useful life and which would at the same time be more easily formed into finished tools. These two properties have been heretofore unobtainable in any one alloy. The ferrous alloys heretofore used for high speed steel tools have not had a satisfactory useful life expectancy and have been difficult to machine and form into the ultimate shape of the desired tool. In many instances, these alloys have required intricate and expensive annealing, heating and tempering cycles in order to make it possible to machine them into the precision forms demanded of fine cutting tools, such as gear hubs, form milling cutters, and similar tools. Fabrication of these and other cutting tools from such alloys have been undesirably expensive and difficult to carry out. Alloys to be suitable for high speed tool applications must be tough, be able to take a hard, sharp cutting edge and must be able to retain that edge when operating at high speed in metal cutting applications. All of these properties are directly related to the useful life of tools made from these alloys. Many combinations of alloys have been proposed and tried for this purpose but there has heretofore been no alloy which combined all of these properties and at the same time was readily formed and machined. It has, moreover, heretofore been believed that an alloy which could be readily machined would not have a satisfactory length of life and would not have the toughness and hardness required for high speed tool service.

We have discovered an alloy which has a surprisingly longer useful life after being formed and properly heat treated than that of the comparable ferrous alloys presently used for high speed tool applications and which has in addition properties of easy finishing heretofore unobtainable in high speed tool steels. All this is obtained without sacrificing properties of hardness and toughness. Our invention accordingly provides an alloy which combines longer tool life and easy finishing, two properties which have been heretofore deemed to be mutually exclusive. Broadly the composition of our alloy lies within the following ranges of concentration of alloying elements:

Table I

| | |
|---|---|
| Carbon | About .6 to 2.5%. |
| Silicon | About 1% max. |
| Manganese | About 1% max. |
| Sulphur | About .05 to .5%. |
| Phosphorus | About .04% max. |
| Chromium | About 2 to 9%. |
| Vanadium | About .5 to 7%. |
| Cobalt | Optional up to about 15%. |
| Tungsten | Optional up to about 24%. |
| Molybdenum | Optional up to about 12%. |

The total tungsten plus 2 times the molybdenum being between about 8 to 24%.

The remainder iron with residual impurities in usual amounts.

Alloys suitable for most high speed tool applications may be, however, made within the narrower range of:

Table II

| | |
|---|---|
| Carbon | About .75% to about 1.5%. |
| Silicon | About .5% max. |
| Manganese | About .5% max. |
| Sulphur | About .08 to .20%. |
| Phosphorus | About .04% max. |
| Chromium | About 3.75 to 4.5%. |
| Vanadium | About 1 to 3½%. |
| Tungsten | Optional to about 18%. |
| Molybdenum | Optional to about 9%. |

The total tungsten plus 2 times molybdenum being between about 9 to 18%.

The remainder iron with residual impurities in ordinary amounts.

When we have mentioned "tungsten plus 2 times molybdenum," we mean that the percent of tungsten plus twice the percent of molybdenum present in the alloy shall equal the given figure. Either one of tungsten or molybdenum but not both may be entirely absent. At least one of these alloys must be present within the given range in order to produce a satisfactory high speed tool steel within our invention. Within the above ranges of composition ferrous alloys of our invention have been made to following specifications:

Table III

| | | | | |
|---|---|---|---|---|
| Carbon......percent.. | .77–.83 | .79–.86 | 1.18–1.23 | .84–.9. |
| Silicon..........do.... | .15–.4 | .15–.4 Max | .2–.3 | .15–.4. |
| Manganese....do.... | .15–.35 | .15–.4 | .2–.3 | .15–.4. |
| Sulphur........do.... | .08–.2 | .08–.2 | .08–.2 | .08–.2. |
| Phosphorus....do.... | .03 Max | .03 Max | .03 Max | .03 Max. |
| Tungsten......do.... | 1.3–2 | 6–6.75 | 5–6.25 | |
| Chromium....do.... | 3.5–4.25 | 3.9–4.4 | 4–4.25 | 3.75–4.5. |
| Vanadium....do.... | 1–1.3 | 1.7–2.1 | 3.1–3.3 | 1.8–2.2. |
| Molybdenum.do.... | 7.75–9.25 | 4.75–5.25 | 5–6.25 | 7.75–9. |

The remainder iron with residual impurities in ordinary amounts.

| | | | | |
|---|---|---|---|---|
| Carbon..............percent.. | .70–.76 | .7–.74 | 1.46–1.54. | |
| Silicon..........do.... | .25–.35 | .2–.3 | .2–.3. | |
| Manganese........do.... | .2–.3 | .2–.3 | .2–.3. | |
| Sulphur..........do.... | .08–.2 | .08–.2 | .08–.2. | |
| Phosphorus........do.... | .03 Max | .03 Max | .03 Max. | |
| Tungsten........do.... | 17.5–18.5 | 18–19 | 13–14. | |
| Chromium........do.... | 3.9–4.2 | 4–4.25 | 4.25–4.75. | |
| Vanadium........do.... | 1–1.15 | 1–1.25 | 4.5–5. | |
| Molybdenum......do.... | | | | |
| Cobalt..........do.... | | 4.5–5.5 | 4.75–5.25. | |

The remainder iron with residual impurities in ordinary amounts.

The single preferred composition of our invention is:

Table IV

| | |
|---|---|
| Carbon | .85%. |
| Silicon | .25%. |
| Manganese | .25%. |
| Sulphur | .15%. |
| Phosphorus | .025% max. |
| Tungsten | 6.5%. |
| Chromium | 4.2%. |
| Vanadium | 2%. |
| Molybdenum | 5%. |

The remainder iron with residual impurities in ordinary amounts.

Small amounts of nickel, copper, tantalum, columbium and titanium may be present in the alloy of our invention and do not detract from its advantageous properties.

We do not, however, require the presence of any of these in our alloy.

An alloy having the composition within the limits given above will have forging and hardening characteristics similar to those of ordinary high speed steels of equivalent carbon contents and will have in addition unusual properties of extended tool life and finishing ease beyond that of the present standard high speed steels.

Our researches indicate that the alloy of the present invention gets its unusual properties from the high content of sulphur, chromium and vanadium in the presence of carbides. Our researches have shown that the sulphur is not combined with the manganese of the alloy in the form usually associated with free machining steels, but when present in the amounts disclosed above is apparently combined with a portion of the chromium and vanadium and possibly other alloying constituents to form a sulphur compound which does not deleteriously affect the hardness and toughness of the alloy as would ordinarily be expected but in fact actually lengthens the life of the tools made from our alloy as compared with tools made from ordinary high speed steels in which the sulphur content has purposely been kept below .03% and which do not contain the sulphur compounds in our alloy. Our researches have not shown what the precise composition of the sulphur compounds formed in our alloy are other than to show that they are not, as pointed out above, the ordinary manganese sulphide of the usual free machining steels. We have also discovered since the filing of application Serial No. 381,520 that they are not molybdenum sulfides as we had originally supposed but appear to be a complex sulfide of chromium and vanadium in close association with or possibly chemically combined with carbides. The sulfide formed in our alloy and which appears to give it its unusual properties does not correspond to any known X-ray diffraction pattern and it appears necessary that it be joined with carbides to give it maximum effectiveness. We do not, however, bind ourselves to any theory for the phenomenal results of the alloy of this invention. The fact is, that whatever the mechanism may be and whatever theory may account for these phenomenal results, the alloy of this invention does have unexpected and unusual properties of lengthened tool life and ease of finishing far beyond that of comparative high speed steels heretofore known.

While we have described and disclosed a preferred embodiment of our invention it is to be understood that it is not so limited but may be otherwise embodied within the scope of the following claims.

We claim:

1. A high speed tool steel comprising about .6 to 2.5% carbon, about 1% maximum silicon, about 1% maximum manganese, about .05 to .5% sulphur, about .04% maximum phosphorus, about 2 to 9% chromium, about .5 to 7% vanadium, optional to about 24% tungsten, optional to about 12% molybdenum, the total tungsten plus 2 times the molybdenum being about 8 to 24%, optional up to about 15% cobalt, the remainder iron with residual impurities in usual amounts.

2. A high speed tool steel comprising about .75% to about 1.5% carbon, about .5% maximum silicon, about .5% maximum manganese, about .08 to .2% sulphur, about .04% maximum phosphorus, about 3.75 to 4.5% chromium, about 1 to 3½% vanadium, optional to about 18% tungsten, optional to about 9% molybdenum, the total tungsten plus 2 times the molybdenum being about 8 to 24%, and the remainder iron with residual impurities in ordinary amounts.

3. A high speed tool steel comprising about .77 to .83% carbon, about .15 to .4% silicon, about .15 to .35% manganese, about .08 to .2% sulphur, .03% maximum phosphorus, about 1.3 to 2% tungsten, about 3.5 to 4.25% chromium, about 1 to 1.3% vanadium, about 7.75 to 9.25% molybdenum, the remainder iron with residual impurities in ordinary amounts.

4. A high speed tool steel comprising about .79 to .86% carbon, about .15 to .4% silicon, about .15 to .4% manganese, about .08 to .2% sulphur, about .03% maximum phosphorus, about 6 to 6.75% tungsten, about 3.9 to 4.4% chromium, about 1.7 to 2.1% vanadium, about 4.75 to 5.25% molybdenum, the remainder iron with residual impurities in ordinary amounts.

5. A high speed tool steel comprising about 1.18 to 1.23% carbon, about .2 to .3% silicon, about .2 to .3% manganese, about .08 to .2% sulphur, about .03% maximum phosphorus, about 5 to 6.25% tungsten, about 4 to 4.25% chromium, about 3.1 to 3.3% vanadium, about 5 to 6.25% molybdenum, the remainder iron with residual impurities in ordinary amounts.

6. A high speed tool steel comprising about .84 to .9% carbon, about .15 to .4% silicon, about .15 to .4% manganese, about .08 to .2% sulphur, .03% maximum phosphorus, about 3.75 to 4.5% chromium, about 1.8 to 2.2% vanadium, about 7.75 to 9% molybdenum, the remainder iron with residual impurities in ordinary amounts.

7. A high speed tool steel comprising about .85% carbon, about .25% silicon, about .25% manganese, about .15% sulphur, about .025% maximum phosphorus, about 6.5% tungsten, about 4.2% chromium, about 2% vanadium, about 5% molybdenum, the remainder iron with residual impurities in ordinary amounts.

8. A high speed tool formed from a steel alloy comprising about .6 to 2.5% carbon, about 1% maximum silicon, about 1% maximum manganese, about .05 to .5% sulphur, about .04% maximum phosphorus, about 2 to 9% chromium, about .5 to 7% vanadium, optional to about 24% tungsten, optional to about 12% molybdenum, the total tungsten plus 2 times the molybdenum being about 8 to 24%, optional up to about 15% cobalt, the remainder iron with residual impurities in usual amounts, said tool being characterized by longer tool life and ease of finishing as compared with conventional molybdenum-containing high speed steels of equivalent carbon and vanadium contents.

9. A high speed tool formed from a steel alloy comprising about .75% to about 1.5% carbon, about .5% maximum silicon, about .5% maximum manganese, about .08 to .2% sulphur, about .04% maximum phosphorus, about 3.75 to 4.5% chromium, about 1 to 3½% vanadium, optional to about 18% tungsten, optional to about 9% molybdenum, the total tungsten plus 2 times the molybdenum being about 8 to 24%, the remainder iron with residual impurities in ordinary amounts, said tool being characterized by improved machineability and longer tool life as compared with conventional molybdenum-containing high speed steels of equivalent carbon and vanadium contents.

10. A high speed tool formed from a steel alloy comprising about .77 to .83% carbon, about .15 to .4% silicon, about .15 to .35% manganese, about .08 to .2% sulphur, .03% maximum phosphorus, about 1.3 to 2% tungsten, about 3.5 to 4.25% chromium, about 1 to 1.3% vanadium, about 7.75 to 9.25% molybdenum, the remainder iron with residual impurities in ordinary amounts, said tool being characterized by improved machineability and longer tool life as compared with conventional molybdenum-containing high speed steels of equivalent carbon and vanadium contents.

11. A high speed tool formed from a steel alloy comprising about .79 to .86% carbon, about .15 to .4% silicon, about .15 to .4% manganese, about .08 to .2% sulphur, about .03% maximum phosphorus, about 6 to 6.75% tungsten, about 3.9 to 4.4% chromium, about 1.7 to 2.1% vanadium, about 4.75 to 5.25% molybdenum, the remainder iron with residual impurities in ordinary amounts, said tool being characterized by improved machineability and longer tool life as compared with conventional molybdenum-containing high speed steels of equivalent carbon and vanadium contents.

12. A high speed tool formed from a steel alloy comprising about 1.18 to 1.23% carbon, about .2 to .3% silicon, about .2 to .3% manganese, about .08 to .2% sulphur, about 0.3% maximum phosphorus, about 5 to 6.25% tungsten, about 4 to 4.25% chromium, about 3.1 to 3.3% vanadium, about 5 to 6.25% molybdenum, the remainder iron with residual impurities in ordinary amounts, said tool being characterized by improved machineability and longer tool life as compared with conventional molybdenum-containing high speed steels of equivalent carbon and vanadium contents.

13. A high speed tool formed from a steel alloy comprising about .84 to .9% carbon, about .15 to .4% silicon, about .15 to .4% manganese, about .08 to .2% sulphur, about .03% maximum phosphorus, about 3.75 to 4.5% chromium, about 1.8 to 2% vanadium, about 7.75 to 9% molybdenum, the remainder iron with residual impurities in ordinary amounts, said tool being characterized by improved machineability and longer tool life as compared with conventional molybdenum-containing high speed steels of equivalent carbon and vanadium contents.

14. A high speed tool formed from a steel alloy comprising about .85% carbon, about .25% silicon, about .25% manganese, about .15% sulphur, about .025% maximum phosphorus, about 6.5% tungsten, about 4.2% chromium, about 2% vanadium, about 5% molybdenum, the remainder iron with residual impurities in ordinary amounts, said tool being characterized by improved machineability and longer tool life as compared with conventional molybdenum-containing high speed steels of equivalent carbon and vanadium contents.

15. A high speed tool steel consisting essentially of carbon within the range of .75% to 1.5%, silicon .75% maximum, manganese 1% maximum, sulphur .1% to .3%, molybdenum .5% to 11%, chromium 2% to 9%, vanadium 2% to 5%, tungsten up to 20%, and the balance iron and incidental impurities.

16. A high speed tool steel consisting essentially of carbon within the range .75% to 1.5%, silicon .75% maximum, manganese 1% maximum, sulphur .1% to .3%, molybdenum 3% to 11%, chromium 2% to 9%, vanadium 2% to 5%, tungsten up to 10% and the balance iron and incidental impurities.

17. A high speed tool steel consisting essentially of carbon within the range of 0.75 to 1.5%, silicon 0.75% maximum, manganese 1% maximum, sulfur 0.1 to 0.3%, molybdenum 0.5 to 11%, chromium 3.9 to 9%, vanadium 0.5 to 5%, tungsten up to 20%, and the balance iron and incidental impurities.

References Cited in the file of this patent

UNITED STATES PATENTS

| | | |
|---|---|---|
| 1,345,732 | Arnold | July 6, 1920 |
| 2,030,342 | Wissler | Feb. 11, 1936 |
| 2,204,283 | Potts | June 11, 1940 |

FOREIGN PATENTS

| | | |
|---|---|---|
| 359,326 | Great Britain | Oct. 22, 1931 |